United States Patent [19]

Baiborodov et al.

[11] Patent Number: 4,777,003
[45] Date of Patent: Oct. 11, 1988

[54] METHOD OF PRODUCING PLAIN BEARING SHELL WITH SHOCK-ABSORBING ANTI-FRICTION COATING

[75] Inventors: Jury I. Baiborodov; Anatoly N. Ezhov, both of Kuibyshev; Evgeny V. Litvinov, Moscow; Jury A. Manenkov; Vladimir A. Morskov, both of Cheboxary; Igor B. Pokrovsky, Kuibyshev; Alexandr G. Sergeev, Cheboxary; Ita N. Kodnir, Kuibyshev, all of U.S.S.R.

[73] Assignees: Cheboxarsky Elektromekhanichesky Zavod, Cheboxary; Kuibyshevsky Aviatsionny Institut, Kuibyshev, both of U.S.S.R.

[21] Appl. No.: 49,104
[22] PCT Filed: Jul. 30, 1985
[86] PCT No.: PCT/SU85/00063
§ 371 Date: Mar. 27, 1987
§ 102(e) Date: Mar. 27, 1987
[87] PCT Pub. No.: WO87/00894
PCT Pub. Date: Feb. 12, 1987
[51] Int. Cl.⁴ ............... B29C 43/18; B29C 65/02
[52] U.S. Cl. ................... 264/273; 264/271.1; 264/127; 264/257; 264/297.4
[58] Field of Search ............. 264/127, 241, 273, 265, 264/257, 271.1, 319, 322, 258, 297.4

[56] References Cited

U.S. PATENT DOCUMENTS

| 2,689,380 | 9/1954 | Tait | 264/127 |
| 2,691,814 | 10/1954 | Tait | 264/127 |
| 2,837,772 | 6/1958 | Deakin | 264/127 |
| 2,976,093 | 3/1961 | Reiling | 264/127 |
| 3,501,360 | 3/1970 | Mancel | 264/127 |
| 4,036,668 | 7/1977 | Brandon | 264/127 |
| 4,657,717 | 4/1987 | Cattanach et al. | 264/258 |
| 4,668,729 | 5/1987 | Kataoka | 264/297.4 |

Primary Examiner—Richard V. Fisher
Assistant Examiner—Coreen Y. Lee
Attorney, Agent, or Firm—Burgess, Ryan and Wayne

[57] ABSTRACT

A method of producing a plain bearing shell with shock-absorbing anti-friction coating consisting in placing a blank (1) in the form of a compressed tangle of metal wire helices into a die (2), overlaying the blank (1) with a sheet (3) of fluoroplastic, heating the blank (1) and the sheet (3) to 220°–260° C., punching them under a pressure of 100–150 MPa with a time delay of 4–6 min, and cooling.

3 Claims, 2 Drawing Sheets

METHOD OF PRODUCING PLAIN BEARING SHELL WITH SHOCK-ABSORBING ANTI-FRICTION COATING

TECHNICAL FIELD

The invention relates to mechanical engineering and is specifically concerned with a method of producing plain bearing shell with shock-absorbing anti-friction coating.

BACKGROUND ART

There is known a method of producing a plain bearing shell with shock-absorbing anti-friction coating (cf. USSR Inventor's Certificate No. 183174 of July 27, 1960, published on June 17, 1966 in Journal of Discoveries, Inventions, Industrial Designs, Trademarks No. 13).

In the known method of producing a shell with shock-absorbing anti-friction coating, a blank is formed by punching randomly arranged metal wire helices which get tangled under the pressure.

The blank is placed in a die and overlaid with a sheet of fluoroplastic of a shape corresponding to the outline of the inner cavity of the die in plan. The die is heated up to around 200° C. integrally with the blank and fluoroplastic sheet, punched under a pressure of some 50 MPa with a pause, and cooled under the same pressure for 20–30 min.

The known method cannot provide for an adequate strength of the coating due to poor bonding of the fluoroplastic sheet to the blank.

Under the conditions of the known process, the fluoroplastic sheet penetrates the blank by an amount less than three diameters of the wire made wherefrom are the helices. As a result, the fluoroplastic sheet separates from the blank in service.

This defect is particularly prone to occur at elevated temperatures, under loads applied tangentially to the surface of the fluoroplastic sheet, during the starting and stopping of the equipment used wherein is the bearing shell, and in case of a high vibration.

DISCLOSURE OF THE INVENTION

The principal object of the present invention is to provide a method of producing plain bearing shells with shock-absorbing anti-friction coating which ensures high quality of shells.

This object is realized by contemplating a method of producing plain bearing shells with shock-absorbing anti-friction coating consisting in placing a blank in the form of a compressed tangle of metal wire helices into a die, overlaying the blank with a sheet of fluoroplastic of a shape corresponding to the outline of the inner cavity of the die in plan, heating the blank and the fluoroplastic sheet, punching the blank and the sheet with a time delay without relieving of the pressure and cooling them, wherein according to the invention the temperature of the heating-up is 220°–260° C., the punching is carried out under a pressure of 100–150 MPa with a time delay of 4–6 min and the cooling takes place after removing the pressure.

By implementing the disclosed method of producing a plain bearing shell with shock-absorbing anti-friction coating, referred to hereinafter as the disclosed method for the sake of brevity, the quality of shells is improved.

Tiny columns of fluoroplastic that form at the surface of the fluoroplastic sheet due to the heating up and punching penetrate the blank through a distance which invariably equals 3 to 5 diameters of the wire made wherefrom are the helices of the blank, establishing thus a firm link between the sheet and the blank.

The long-term strength of bonding is not influenced by the effect of elevated temperatures, vibrations loads and loads applied along a line tangent to the surface of the fluoroplastic sheet.

Moreover, the disclosed method yields shells with a stable elastic and shock-absorbing behaviour. A constant depth of penetration of the blank by the columns of fluoroplastic indicated above caters for this property of shells.

A stable elastic behaviour, in its turn, provides for uniform distribution of load over the surface of a shell produced by the disclosed method as well as between the shells of a plain bearing when this is composed of more than one shell produced by the disclosed method.

This applies, for example, to a thrust bearing of hydraulic turbine made up of several self-adjusting pads arranged in a circle.

The fact that the cooling takes place on removing the pressure increases the productivity of the process under the conditions given above.

The shell is cooled not inside the die, as in the known method, but outside thereof. Since the die is not cooled in this case, it can be recycled with less delay.

The power required for heating up the die during the next productive cycle is saved.

The costly press used during the process is utilized more efficiently due to the cooling of the shell on removing the pressure.

It is expedient to overlay, preparatory to the heating up, the wire blank and fluoroplastic sheet with a stiff plate of a shape corresponding to the outlet of the inner cavity of the die in plane and place a second sheet of fluoroplastic and a second wire blank on top of the plate.

This operation greatly improves the quality of the shells produced. Owing to the stiff plate interposed between the sheets of fluoroplastic, the material of each sheet flows during the punching in one direction only, i.e. towards the corresponding wire blank. Deforming due to the pressure applied, the blanks are firmly pressed against the walls of the die so that no plastic material can flow through the clearance between the die and the punch.

In the absence of a flow of fluoroplastic through the clearance between the die and the punch, the pressure applied by the press is distributed over the surfaces of both the fluoroplastic sheets and the wire blanks in a more uniform way as compared with the known method. This results in a uniform depth of penetration of the wire blanks by the fluoroplastic columns all over the surface of each blank.

The absence of a flow of fluoroplastic towards the clearance between the die and the punch along a line tangent to the surface of each wire blank prevents damage of the fluoroplastic columns which link each fluoroplastic sheet to the corresponding wire blank.

Apart from that, a simultaneous production of two shells increases the productivity of the process.

The stiff plate interposed between the fluoroplastic sheets eliminates the ill-effects of the non-uniformity that commonly exists in the thickness of the sheets and in the compacting of the wire helices which are the material of the blanks.

This improves the elastic and shock-absorbing behaviour of the shells.

The disclosed method of punching two wire blanks and two fluoroplastic sheets at a time is recommended to implement only under the conditions indicated above, for exactly they provide for the penetration of the fluoroplastic columns through a distance of 3–5 diameters of the wire made wherefrom are the helices.

This depth of penetration provides for a firm link between the fluoroplastic sheets and the wire blanks and for a stability of the elastic and shock-absorbing behaviour of the shells produced.

It is also expedient to apply an anti-friction compound to the surface of the stiff plate before placing this upon the wire blank and fluoroplastic sheet.

The anti-friction compound provides for a further improvement in the elastic and shock-absorbing behaviour of the shell, rendering it more uniform.

Fluoroplastic sheets are commonly of a thickness which varies from area to area. To offset this inequality, the plastic flows from thicker places to thinner ones. The antifriction compound reduces the friction between the flow of the plastic and the stiff plate.

This mechanism of the disclosed method provides for fabricating quality shells of plain bearing with a shock-absorbing and anti-friction coating.

The high-strength bonds set up between the fluoroplastic sheet and the wire blank ensure good long-term performance of the shells which is not affected by elevated temperatures, vibration and tangential loads applied to the fluoroplastic sheet.

A uniform elastic behaviour of the shell at every point of its surface provides for a uniform distribution of service loads.

These assets of the shells produced by the disclosed method render the shells suitable for use in crucial heavy-duty plain bearings such as thrust bearings of hydraulic turbines, including reversible pump/turbines for pumped storage power plants.

A preferred embodiment of the present invention will now be described by way of an example with reference to the accompanying drawings.

BEST MODE FOR CARRYING OUT THE INVENTION

The sequence of events in carrying out the method of producing a plain bearing shell with shock-absorbing anti-friction coating according to the invention is as follows.

To produce a blank, metal wire helices are places into a die (not shown) of a size corresponding to the size of the would-be blank and are punched into a tangle.

The diameter of the wire used to make helices is 0.1–0.7 mm, the outside diameter of a helix is 1–10 mm, and the pitch of each helix is 2–10 diameters of the wire. The helices are placed in layers of uniform thickness; the arrangement of the helices in a layer is at random.

The number of the helices to be used to produce a blank is dictated by the requisite thickness of the compressed blank which should be 10–40 diameters of the wire.

Figure 1:
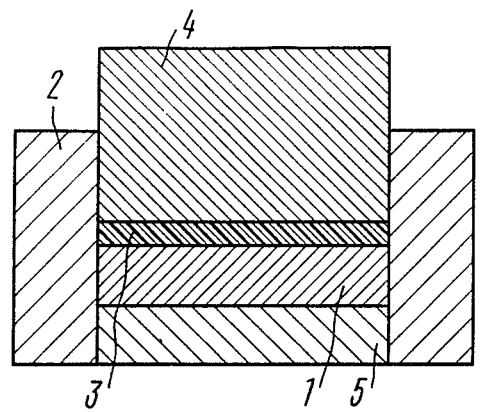
FIG. 1 is a schematic representation of a die with a blank and a sheet of fluoroplastic.

The wire blank 1 (FIG. 1) thus formed is placed into a die 2 of a preheated die block (not shown) and is overlaid with a sheet 3 of fluoroplastic of a shape corresponding to the outline of the inner cavity of the die 2 in plan.

A punch 4 is introduced into the die 2.

On placing the die block on the bed (not shown) of a press (not shown) of any known type—for example a hydraulic one—suitable for the job, the blank 1 and the fluoroplastic sheet 3 are heated to between 220° and 260° C.

An overheating of the fluoroplastic sheet 3 should be carefully avoided, for otherwise the plastic will decompose, liberating toxic gases (hydrogen fluoride).

An underheating of the fluoroplastic sheet 3 is intolerable as well. At temperatures under 220° C., the fluoroplastic columns penetrate to a depth less than one equalling 3–5 diameters of the wire made wherefrom is the blank. This will impair the strength of bonds.

The blank 1 is punched together with the fluoroplastic sheet 3 under a pressure of 100–150 MPa with a time delay of 4–6 min. The product is a shell with a shock-absorbing anti-friction coating.

Any combination of a pressure and a temperature within the specified limits ensures a penetration of the blank 1 by the fluoroplastic columns to a depth equalling 3–5 diameters of the wire made wherefrom is the blank.

A punching pressure under 100 MPa fails to ensure a firm bonding of the fluoroplastic sheet 3 to the wire blank 1 even if the time delay exceeds the specified 4–6 min.

A punching pressure over 150 MPa increases the depth of penetration of the wire blank 1 by the fluoroplastic columns in excess of five diameters of the wire even if the time delay is less than 4 min.

However, this will not increase the strength of bonding of the fluoroplastic sheet 3 to the wire blank 1.

A maximum strength is obtainable when the depth of penetration is just equalling five diameters of the wire.

A further increase in the depth of penetration of the fluoroplastic columns does not increase the strength of the bonds. But it reduces the thickness of the layer of the blank 1 which is outside the reach of the fluoroplastic columns. The result is a worsening of the shock-absorbing properties of the shell.

At the end of the period of the time delay in punching, the blank 1 and the fluoroplastic sheet 3, the pressure is removed and the shell is cooled.

For the cooling, the shell is removed from the die with the aid of an ejector 5 and placed on a tray (not shown).

Figure 2:
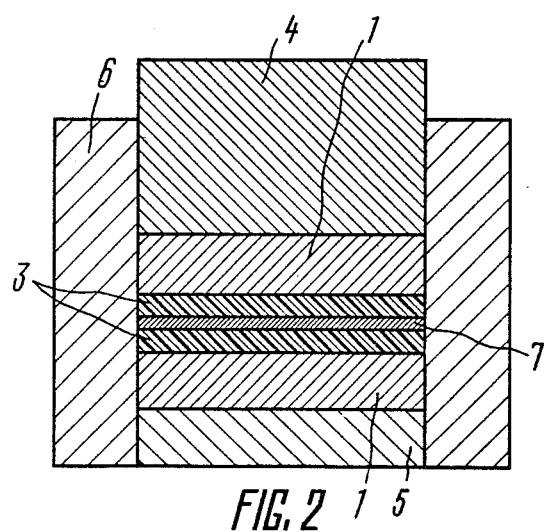
FIG. 2 is a schematic representation of a die contained wherein are two blanks, two sheets of fluoroplastic, and a stiff plate.

In another embodiment of the invention, a stiff plate 7, e.g. a metal one, of a shape corresponding to the outline of the inner cavity of a die 6 (FIG. 2) in plan is placed on top of the blank 1 and the fluoroplastic sheet 3 before heating them up. The stiff plate 7 is overlaid with a second fluoroplastic sheet 3 and a second blank 1.

An anti-friction compound is applied to the surface of the stiff plate 7 in any known way, e.g. by dipping, preparatory to placing the blank 1 with the fluoro-plastic sheet 3 thereupon.

On removing the formed shell with shock-absorbing anti-friction coating from the die, the die temperature is taken. If it is 220° C. or higher, the forming of other blanks 1 with fluoroplastic sheets 3 can be continued.

Figure 3:
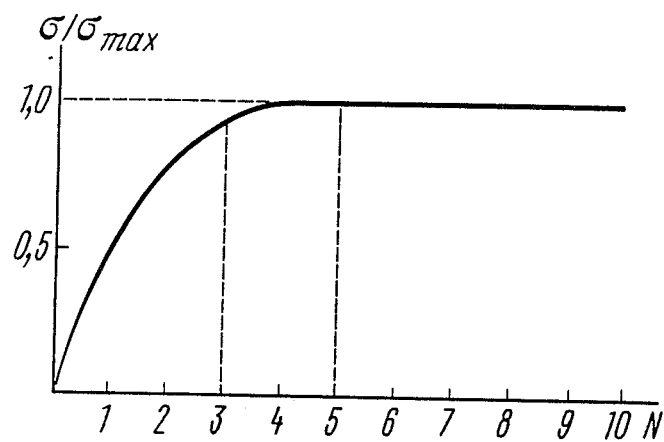
FIG. 3 is a curve demonstrating the relationship between the relative strength $\sigma/\sigma_{max}$ of the fluoroplastic sheet-to-blank bond and the depth, N, of penetration of the blank by the fluoroplastic columns.

Referring to FIG. 3, it is a curve demonstrating the experimentally obtained relationship between the relative strength, $\sigma/\sigma_{max}$, of the fluoroplastic sheet-to-blank bond and the depth, N, of penetration of the blank 1 by the fluoroplastic columns expressed in terms of the diameter of the wire made wherefrom are the helices.

The relative strength $\sigma/\sigma_{max}$ is thought of as the ratio of the strength $\sigma/\sigma_{max}$ of the bond obtained due to the penetration of the blank by the fluoroplastic columns to various depths and the maximum strength $\sigma/\sigma_{max}$ of the bond obtained when the depth of penetration of the fluoroplastic columns greatly exceeds a distance equalling five diameters of the wire.

It can be seen from the curve that the relative strength $\sigma/\sigma_{max}$ sharply decreases when the depth, N, of penetration is less than three diameters of the wire. The relative strength $\sigma/\sigma_{max}$ does not increase when the depth N of penetration is in excess of five wire diameters.

Figure 4:
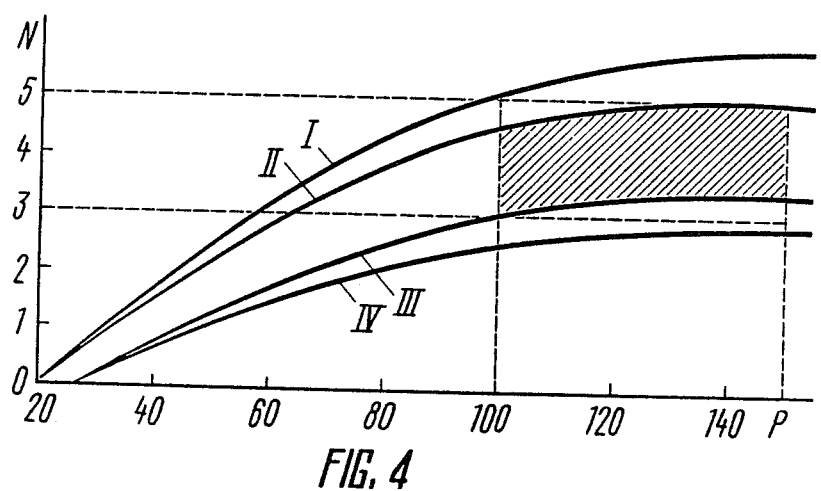
FIG. 4 shows curves illustrating the relationship between the depth, N, of penetration of the blank by the fluoroplastic columns and the punching pressure, P, applied with various time delays at various temperatures of the fluoroplastic sheet and blank.

FIG. 4 illustrates experimentally obtained curves of the effect of the punching pressure P in MPa on the depth, N, of penetration of the blank 1 by the fluoroplastic columns expressed in terms of the diameter of the wire.

Curve 1 was plotted at a temperature of 260° C. of the blank 1 and the fluoroplastic sheet 3 and a time delay of 7 min during the punching.

Curve II was plotted at a temperature of 260° C. and a time delay of 6 min.

Curve III was plotted at a temperature of 220° C. and a time delay of 4 min.

Curve IV was plotted at a temperature of 220° C. and a time delay of 3 min.

The hatched area indicates the range of pressure, temperature and time delay during punching which provide for a penetration of the blank 1 by the fluoroplastic columns to a depth of three to five wire diameters.

It can be seen from FIG. 4 that any combination of the parameters specified for the disclosed method provides for a penetration of the blank 1 by the fluoro-plastic columns to a depth equalling three to five wire diameters. Any combination of other parameters results either in a lessening of the penetration of the blank by the fluoroplastic columns with a drasting reduction in strength or in a building up of the penetration and impaired shock-absorbing properties of the shell.

Experimental shells with shock-absorbing anti-friction coating produced by the disclosed method were tested on a hydraulic turbine in real service conditions.

The tests have proved good performance of the shells produced by a high-productivity process.

INDUSTRIAL APPLICABILITY

The present invention may be used to advantage in manufacturing shells for thrust bearings of hydraulic turbines.

Shock-absorbing anti-friction bearing shells produced by the method according to the invention may find application in large electrical machines, grinding mills, reducers, rolling mills, marine engines as well.

We claim:

1. A method of producing a plain bearing shell with shock-absorbing anti-friction coating which comprises placing a blank (1) in the form of a compressed tangle of metal wire helices into a die (2), overlaying the blank (1) with a sheet (3) of fluoroplastic of a shape corresponding to the outline of the inner cavity of the die (2) in plan, heating the blank (1) and the fluoro-plastic sheet (3), punching the blank (1) and the fluoro-plastic sheet (3) wherein the penetration depth of the blank by the fluoroplastic equals to 3-5 diameters of said wire and with a time delay without relieving the pressure, and cooling them, wherein the heating temperature is 220°-260° C., the punching is carried out under a pressure of 100-150 MPa with a time delay of 4-6 min. during punching and the cooling takes place after removing the pressure.

2. A method as in claim 1, wherein the blank (1) and the fluoroplastic sheet (3) are over-laid preparatory to the heating up with a stiff plate (7) of a shape corresponding to the outline of the inner cavity of the die (2) in plan and a second sheet (3) of fluoroplastic and a second blank (1) are placed on top of the stiff plate (7).

3. A method as in claim 2, wherein an anti-friction compound is applied to the surface of the stiff plate (7) before placing this upon the blank (1) and the fluoroplastic sheet (3).

* * * * *